Dec. 28, 1954 W. L. WEARLY 2,698,079
CONVEYER FRAME STRUCTURE
Original Filed Nov. 23, 1948 2 Sheets-Sheet 1
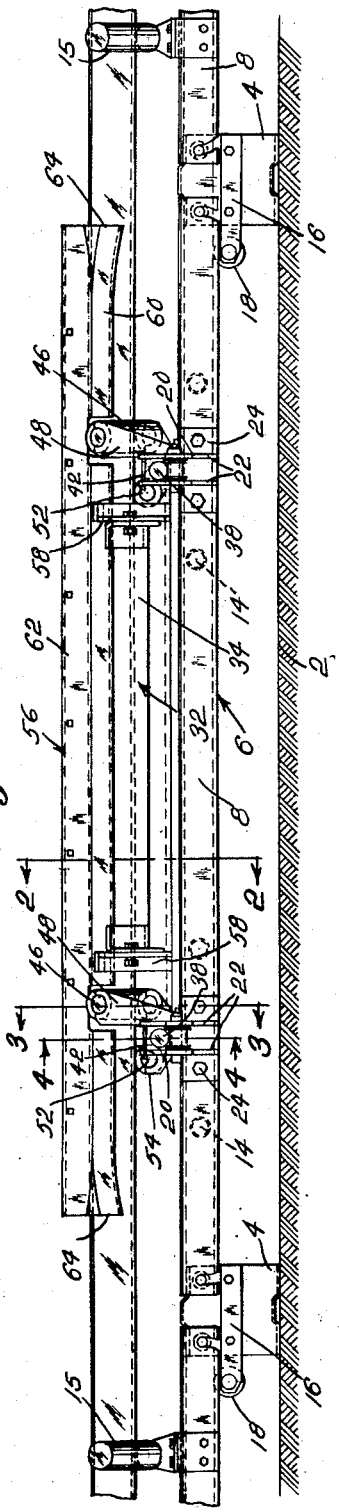
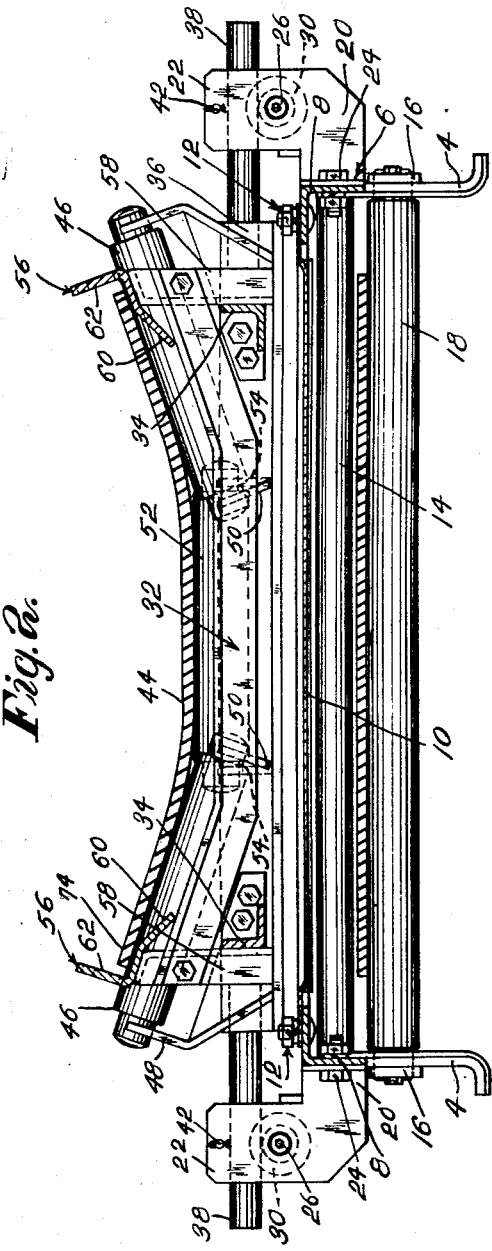
Inventor:
William L. Wearly.
by John F. Schmidt
Attorney.

Dec. 28, 1954 W. L. WEARLY 2,698,079
CONVEYER FRAME STRUCTURE
Original Filed Nov. 23, 1948 2 Sheets-Sheet 2
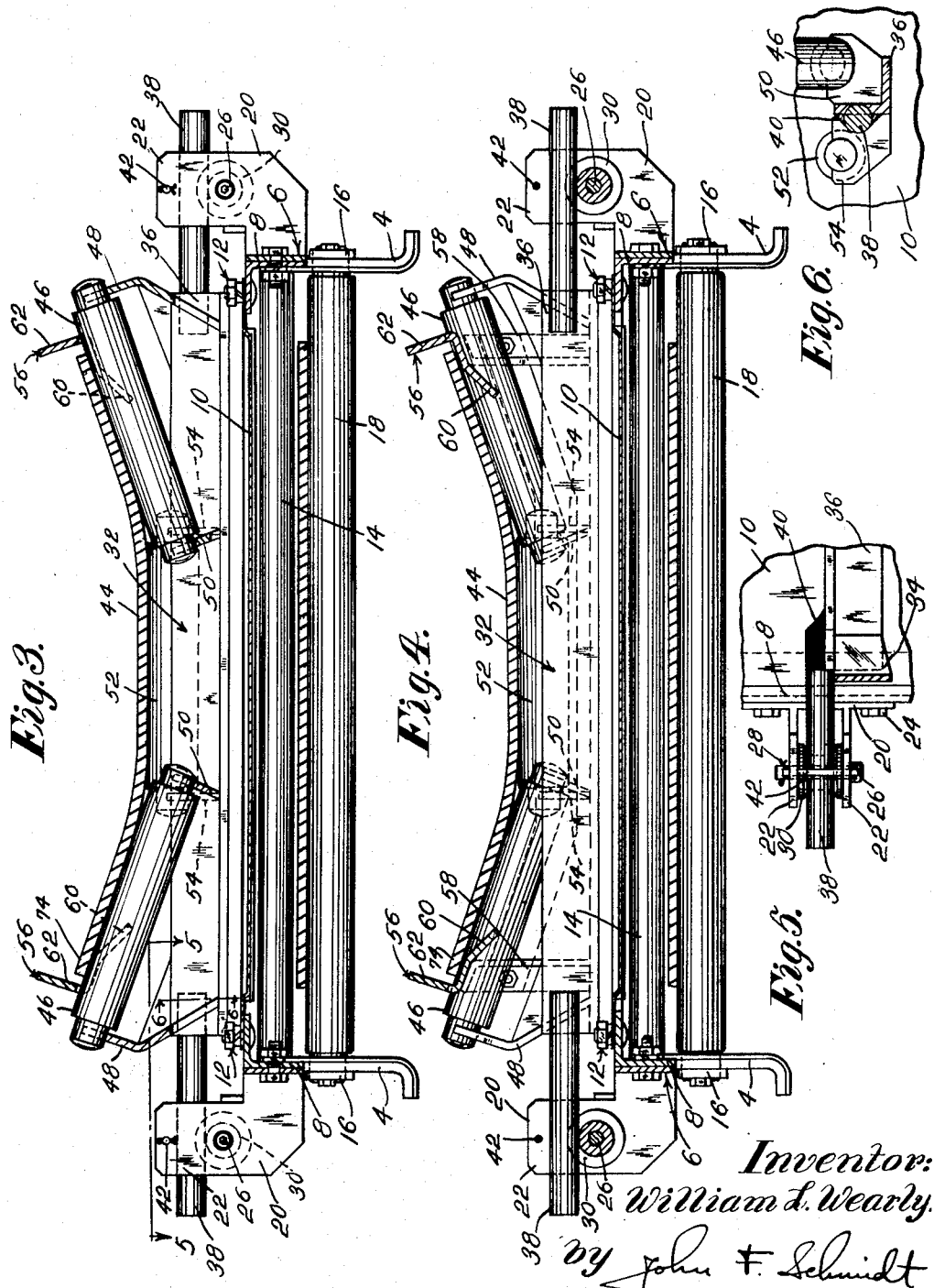
Inventor:
William L. Wearly.
by John F. Schmidt
Attorney.

United States Patent Office 2,698,079
Patented Dec. 28, 1954

2,698,079

CONVEYER FRAME STRUCTURE

William L. Wearly, Pittsburgh, Pa., assignor to Joy Manufacturing Company, Pittsburgh, Pa., a corporation of Pennsylvania Continuation of application Serial No. 61,567, November 23, 1948. This application March 10, 1953, Serial No. 341,457

6 Claims. (Cl. 198—202)

This invention relates to belt conveyors and more particularly to a frame structure for belt conveyors in which the frame which supports the work run of the belt is so constituted, at selected locations, that it automatically follows any transverse misalinement of the work run; this application is a continuation of my application Serial No. 61,567, filed November 23, 1948, and now abandoned.

These are many factors which cause the belts of belt conveyors to wander from side to side. For example, in many applications, the material to be conveyed is loaded on the belt in such a manner that the material is moving, at the time of loading, in a direction transverse to the direction of motion of the conveyor belt. The inertia of the material has a tendency to throw the belt out of alinement; inasmuch as some form of guide or restraining means, such as sideboards, or spillboards, are generally used to keep the belt in its proper path of travel, any extraordinary transverse displacement of the belt causes undue wear of the edge of the belt against the sideboards and occasions early failure of the belt. Furthermore, in many applications of belt conveyors in industry, the material conveyed is loaded onto the belt by a vehicle, such as a shuttle car, which frequently bumps the conveyor at the loading station while coming in to unload. Where no provision is made for the conveyor to yield at that point, the entire structure is knocked out of line.

It is accordingly an object of this invention to provide a belt support for a conveyor belt which allows the belt to wander within certain limits. More specifically, it is an object of this invention to provide a support for a belt conveyor which allows the belt to wander somewhat from its usual path without adversely affecting the belt. It is another object of the invention to provide supporting means for the belt of an endless belt conveyor which may yield somewhat if bumped, and return to normal alinement after the bumping force is removed. These and other objects are accomplished in a mechanism which consists of a first framework and a second framework, the second framework being mounted on the first in such a manner as to be movable relative thereto transversely of the direction of belt motion; the second frame desirably carries means to support the belt in a troughlike configuration and is provided with guide means which are adapted to engage the edge of the belt in order to initiate such transverse adjustment of the second frame on the first as may be necessary.

In the drawings:

Fig. 1 is a side elevational view of a loading station embodying the invention.
Fig. 2 is a view in section on line 2—2 of Fig. 1.
Fig. 3 is a view in section on line 3—3 of Fig. 1.
Fig. 4 is a view in section on line 4—4 of Fig. 1.
Fig. 5 is a view in section on line 5—5 of Fig. 3; and
Fig. 6 is a view in section on line 6—6 of Fig. 3.

A belt conveyor embodying this invention will be placed on any suitable subjacent surface 2 such as a mine bottom or the like. The conveyor is mounted on a plurality of longitudinally spaced legs 4. The legs 4 carry a framework, indicated generally at 6. The framework is made up of sections, and the legs 4 support the mutually adjacent ends of contiguous sections. The sections each include a pair of side frame members 8; the latter may conveniently be made of structural steel angle stock or the like. A conveyor cover plate 10, preferably of sheet metal, is secured to the side frame members 8 by any suitable fastening means such as the nut and bolt assemblies 12. Transverse stiffening members 14 are preferably secured to and between the side frame members at spaced intervals by any suitable means, as, for example, by welding.

The conveyor sections, other than the particular section which is employed at a loading station, carry conventional appropriately bracket-supported belt-guiding and supporting idlers 15.

A bracket 16 is secured to each leg 4. An idler roller 18 is journaled at its ends in the opposed alined brackets 16. Thus a plurality of rollers 18 are provided to support the return run of the belt.

Turning now particularly to the special arrangements which are provided at a loading station, the following will be observed. As is best seen in Fig. 5, a bracket 20 is provided with a pair of closely spaced ears 22 substantially at right angles to the bracket and the side frame members 8. The bracket 20 is secured to the side frame member by any suitable means such as the nut and bolt assemblies 24. The ears 22 are provided with alined openings in which there is mounted a pin 26 held in place by a cotter pin 28. A rotatable member 30, such as the flanged roller shown, is mounted on the pin 26. Thus the roller 30 rotates about an axis which is substantially parallel to the direction of belt movement. In the preferred form of the embodiment shown in the drawings, two brackets 20 are provided on each side frame member 8, each with its roller.

A second framework indicated generally at 32 is mounted on the first framework 6. In the framework 32 there are two side frame members 34 secured to transverse frame members 36. At the ends of the transverse members 36, there are provided rail members 38 secured thereto by any suitable means as by welding as shown at 40 in Figs. 5 and 6. The rail members extend outward with their axes substantially at right angles to the direction of belt movement and are arranged to ride on the flanged rollers 30. It will be seen that the rail members 38 are track-forming elements, and that the flanged rollers 30 are track-engaging elements which cooperate with the members 38 to guide the latter. A pin 42 extends between the two spaced ears 22 of each bracket and serves to prevent the accidental separation of the second framework from the first, because each rail 38 is located between a flanged roller 30 and a pin 42.

A plurality of belt supporting rollers are provided on the second framework 32 in such a manner as to support the work run of the belt 44 in a trough-like configuration. To this end two guide rollers or troughing idlers 46 are mounted in brackets 48 and 50 to rotate about axes which are inclined to the horizontal as shown in the drawings. See especially Fig. 3. The rollers 46 are provided in pairs, one pair at each end of the framework 32, and elevate the edges of the belt to form the sides of the carrying trough. The bottom of the carrying trough is formed by the belt being supported on a third roller 52 cooperating with the rollers 46 and somewhat spaced therefrom in the direction of belt movement as can be seen in Fig. 1. The roller 52 is mounted for rotation in brackets 54.

The belt moves along the rollers between a pair of guides 56 mounted on the second framework 32 by means of brackets 58. The guides 56 have down-turned inward extending flanges 60 and upward extending flanges 62. The upward extending flanges 62 define planes which are substantially perpendicular to the axes of rotation of their respective rollers 46. The guides are flared outward at their ends in the horizontal plane, and also in the vertical direction as shown at 64, so that no sharp edge may be presented to the belt as it moves into the guide.

Operation

If a mineral, such as coal, is deposited on the belt from one side with a considerable velocity, it will have a tendency to displace the belt sidewise. With ordinary loading stations, this sidewise displacement causes the belt edge to bear against the guide means 56, causing wear of the edge which may bring about premature failure of the belt. With a loading station made according to this invention, when the belt edge bears against the guide 56, it moves the entire belt support sidewise, thus relieving pressure on the edge of the belt and avoiding the unnecessary wear which takes place with a conventional loading station.

Furthermore, if a conventional loading station is bumped, as by a shuttle car moving against it to unload, such conventional station is likely to be pushed out of alinement and might remain so misalined for some time. Tension in the belt will tend to straighten out the belt, causing one edge of the belt to bear against the sideboards in the misalined station. If a station made according to the invention is bumped, the transversely movable carriage yields in response to the displacing force, and when that force is removed, the belt tension re-alines the loading station.

Two operating conditions are set forth herein which might cause undue belt wear when conventional loading stations are used; such wear is prevented under those conditions by a station made according to the invention. Other conditions may occur to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In an endless belt conveyor, an endless belt, and supporting means for the belt including a lower supporting frame structure adapted to rest upon a subjacent surface and having guiding and supporting means for the return run of the belt including idler rollers extending transversely of and rotatably supported by the frame structure and having journalling means precluding bodily longitudinal movement of the idler rollers relative to the supporting frame, an upper frame structure having guide rollers for the work run of the belt supported thereon for rotation on axes fixed relative to the upper frame structure and extending transversely thereof, and means to guide the upper frame structure for bodily transverse movement relative to the lower frame structure to permit bodily movement of the guide rollers associated with the work run relative to the idler roller for the return run in a direction longitudinal of said idler rollers.

2. In an endless belt conveyor, an endless belt, and supporting and guiding means for the belt including (1) a supporting frame structure adapted to rest on a subjacent surface and having rotatably supported thereon idlers for supporting and guiding the return run of the belt and, in spaced relation to each other but in fixed relation to the supporting frame, spaced troughing idlers for the work run of the belt, (2) in a position between spaced troughing idlers, a second frame structure carrying in fixed relation thereto other troughing idlers to support the work run of the belt, and (3) means to support and guide the second frame structure for bodily movement, in a direction transverse to the direction in which the endless conveyor belt extends, relative to the first-mentioned troughing idlers and the idlers which support the return run of the belt.

3. Supporting means for the belt of an endless belt conveyor, comprising: a lower supporting frame structure, guide means to support the return run of the belt including idlers supported by said structure for rotation about axes fixed with respect to the structure, an upper frame structure, guide means to support the work run of the belt including idlers supported on the upper frame structure for rotation on axes fixed with respect to the upper frame structure, and means to guide the upper frame structure for movement relative to the lower frame structure and transverse to the direction of normal belt movement.

4. Supporting means as in claim 3, in which the last-named means includes track-forming elements and track-engaging elements cooperable therewith.

5. Supporting means as in claim 4, in which the track-forming elements comprise rail members secured to one of the frame structures, and the track-engaging elements comprise rollers rotatably mounted on the other frame structure.

6. Supporting means for the belt of an endless belt conveyor, comprising: a supporting frame structure, guide means to support the return run of the belt including idlers supported by said structure for rotation about axes fixed with respect to the structure, spaced troughing idlers for the work run of the belt also supported by said structure for rotation about axes fixed with respect to the structure, a second frame structure disposed between spaced troughing idlers, guide means to support the work run of the belt including idlers supported on the second frame structure for rotation on axes fixed with respect to the second frame structure, and means to guide the second frame structure for movement relative to the first-named frame structure transverse to the direction of conveyor belt movement.

No references cited.